United States Patent [19]
Ohshima

[11] Patent Number: 5,144,289
[45] Date of Patent: Sep. 1, 1992

[54] INDICATION DISPLAY UNIT FOR VEHICLES

[75] Inventor: Tsuyoshi Ohshima, Susono, Japan

[73] Assignee: Yazaki Corporation, Tokyo, Japan

[21] Appl. No.: 690,392

[22] Filed: Apr. 25, 1991

Related U.S. Application Data

[63] Continuation of Ser. No. 228,893, Dec. 23, 1988, abandoned.

[30] Foreign Application Priority Data

Dec. 25, 1987 [JP] Japan .................. 62-195889[U]

[51] Int. Cl.$^5$ ................................. G09G 3/02
[52] U.S. Cl. .................... 340/705; 340/980; 359/13; 353/14
[58] Field of Search ............... 340/705, 980; 353/14, 353/15; 350/174; 359/13, 632, 630

[56] References Cited

U.S. PATENT DOCUMENTS 3,715,721  2/1973  Irving et al. ................... 353/13
4,711,544 12/1987  Iino et al. .................... 340/705

*Primary Examiner*—Ulysses Weldon
*Assistant Examiner*—Amare Mengistu
*Attorney, Agent, or Firm*—Nikaido, Marmelstein, Murray & Oram

[57] ABSTRACT

The present invention has disclosed an indication display unit for a vehicle enabling a driver to sight an indicated image on a windshield thereof comprising, a display device for indicating an image thereon, a light source for projecting light to the above display device, a lens through which the indicated image is projected on the windshield, a light conducting means provided between the display device and the lens, having a light detecting element and a window portion therein, a shutter means for intercepting incident sunbeams or the like rotatably arranged near said light conducting means, and a control means for controlling the shutter means.

Most of the conventional indication display devices disclosed so far are provided with a semi-translucent mirror, by which the incident rays of light from external world are conducted to the light detecting element in the same path for projecting the indicated pattern displayed on the display device such as an LCD, resulting in that the above pattern reflected on the windshield or the like are apt to be unclear, whereas the present invention provides a driver with a clear reflection of the indicated image.

7 Claims, 5 Drawing Sheets

INDICATION DISPLAY UNIT FOR VEHICLES

This application is a continuation of application Ser. No. 228,893 filed Dec. 23, 1988 now abandoned.

BACKGROUND OF THE INVENTION

1. Field of the Invention

The present invention relates to an indication display unit for vehicles which provides a driver with the whole information concerning its navigation such as its velocity, revolution frequency of the engine thereof and so on, and more particularly to an indication display unit, in which an indicated pattern (or image) projected from an indication projecting device is reflected on the windshield so that the driver can catch sight of its virtual image further therebehind.

2. Description of the Prior Art

An indication display unit called a "head-up display" as shown in FIG. 5 is widely known as one of the conventional display units.

In the above FIG. 5, the head-up display unit 2 disposed near the windshield 1 is provided with a lens 4 just behind the dashboard 3, and a display device 5 such as an LCD (Liquid Crystal Display), and a light source 6 at the opposite surface thereto.

As shown in the same figure, the pattern 7 indicated on the display device 5 is projected by the light source 6 disposed underneath thereof so as to be finally reflected on the windshield 1 through the lens 4, resulting in that the driver can catch sight of the reflected pattern on the windshield 1 as though it is overlapped with the outside scenery behind thereof.

In this type of the display unit, however, when the sunbeams are directly radiated to the lens 4 of the head-up display unit along the optical axis, the radiated sunbeams are collected on the focal point 10 through the lens 4 so that the display device 5 disposed near there is directly radiated. In this case above, the heating temperature rises quite high in a substantially short time so as to cause the display device 5 to be easily destroyed, especially in the summer time.

In order to solve the above problems, a device for detecting the sunbeams radiated into the lens unit has been disclosed, whereby the radiation of the sunbeams is prevented by use of a shutter plate disposed between the lens and the display device.

FIG. 7 shows the above type of device, in which a semi-translucent mirror 11 is disposed between the lens 4 and the display device 5, so that a part of the incident sunbeams entering through the lens is reflected on the semi-translucent mirror 11 so as to be conducted onto the light detecting element 13.

The signal sent from the light detecting element 13 is inputted to the CPU 19 through an A/D converter, and when the CPU 19 judges that the above light detecting element 13 has detected the light exceeding the predetermined level, a shutter driving circuit 20 is activated by a drive control circuit 21 so as to energize a shutter plate 12.

In the same figure, 14 denotes a protecting case, 15 a blower driver, 16 a display device activating circuit, 17 a temperature detecting element, 18 an A/D converter, 22 an A/D converter, 23 a blower activating circuit, 24 a light source activating circuit, 26 a ventilator and 27 a blower.

However, since the above device has adopted the semi-translucent mirror for conducting the light incident from the external world to the light detecting element in the same path for projecting the above indicated pattern, the light for projecting the above pattern generated in the LCD cell is reduced while it passes through the semi-translucent mirror, whereby the brightness of the indicated pattern which is finally reflected on the projecting surface, such as a windshield, is greatly reduced.

SUMMARY OF THE INVENTION

In order to solve the aforementioned problems, a new type of indication display unit has been disclosed according to the present invention, in which the display device is securely protected without lowering the brightness level of the indicated pattern.

The indication display unit according to the present invention is characterized in that a light conducting plate capable of receiving a part of the external rays of incident light, yet having a window portion through which the indicated pattern can be projected, is disposed between the lens and the display device, whereby the indicated pattern is projected through the above window portion and the rays of incident light are detected by the light detecting means disposed on a part of the projecting surface of the light conducting plate.

DETAILED DESCRIPTION OF THE EMBODIMENT

Figure 7:
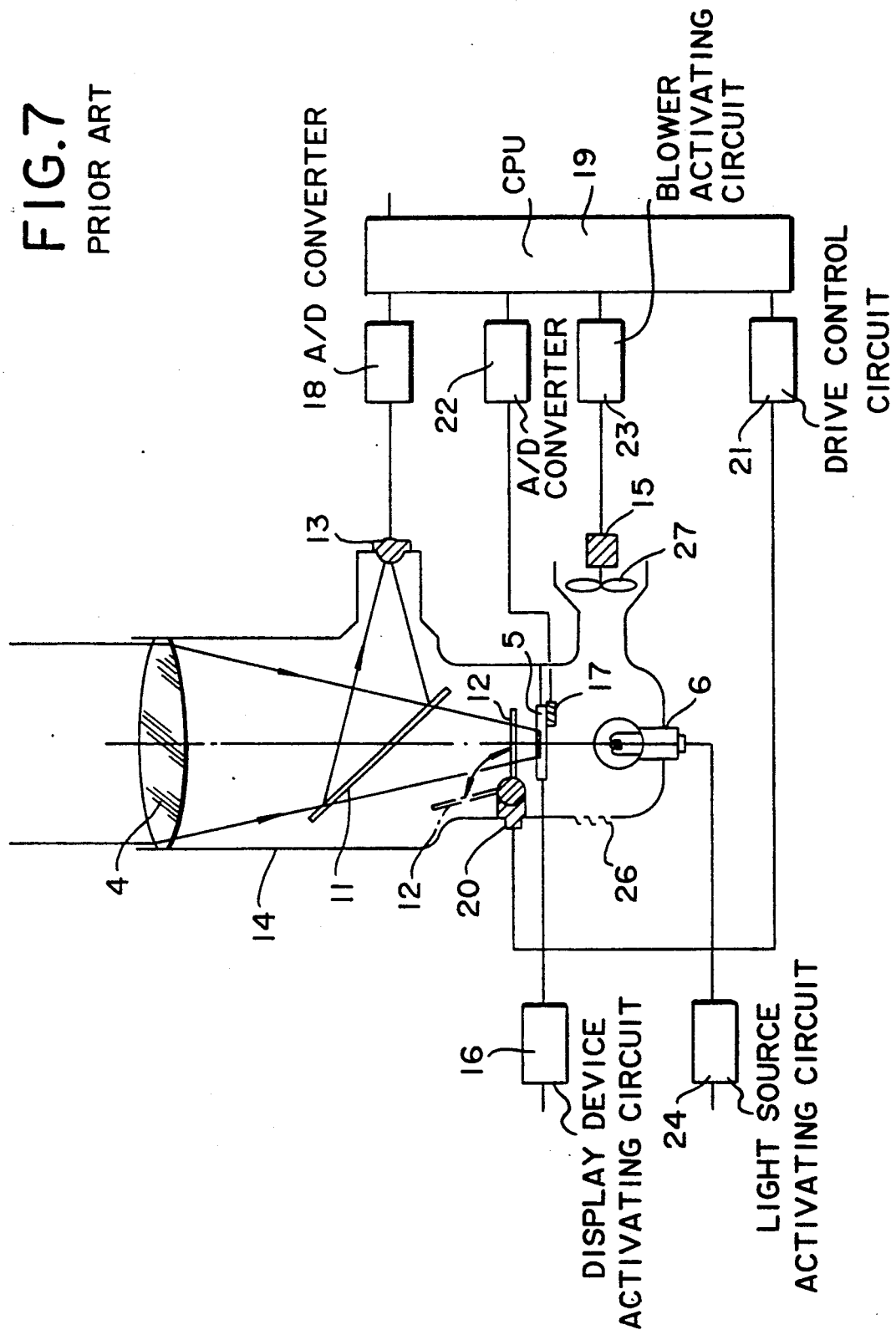

FIG. 1 shows an important part of the embodiment of the present invention, in which the devices such as a temperature detecting element, a converter, and also a blower all shown in FIG. 7 are omitted. The same numerals shown in the both figures indicate the same devices.

The indication projecting device composed of the above-mentioned display device, the light source and the lens is accomodated in the protecting case 14 bent in an "L" shape, the indicated pattern on the display device is reflected by a normal mirror 28 (that reflects all the lights projected thereto), and then projected on the surface of a windshield and so on through the lens 4.

The display device is made of an LCD cell sealed up between two crystal plates, whereby the indicated pattern is forwardly projected by the light projected from the light source 6 passing through the above LCD cell.

Figure 1A:
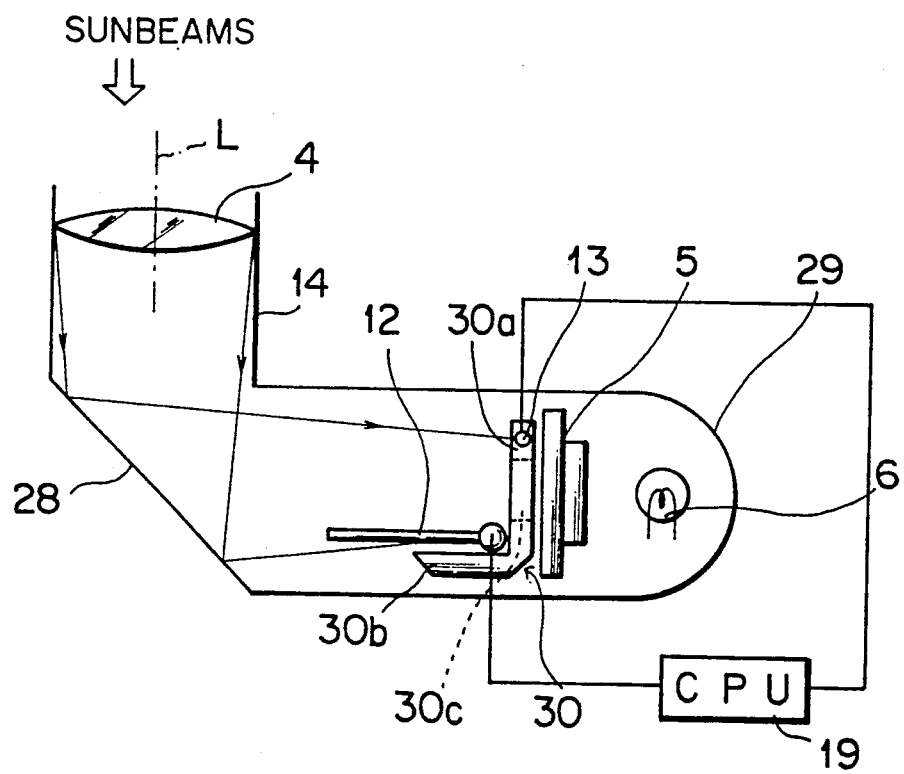
FIG. 1(a)–(b) shows an important part of the embodiment according to the present invention.
Figure 1B:
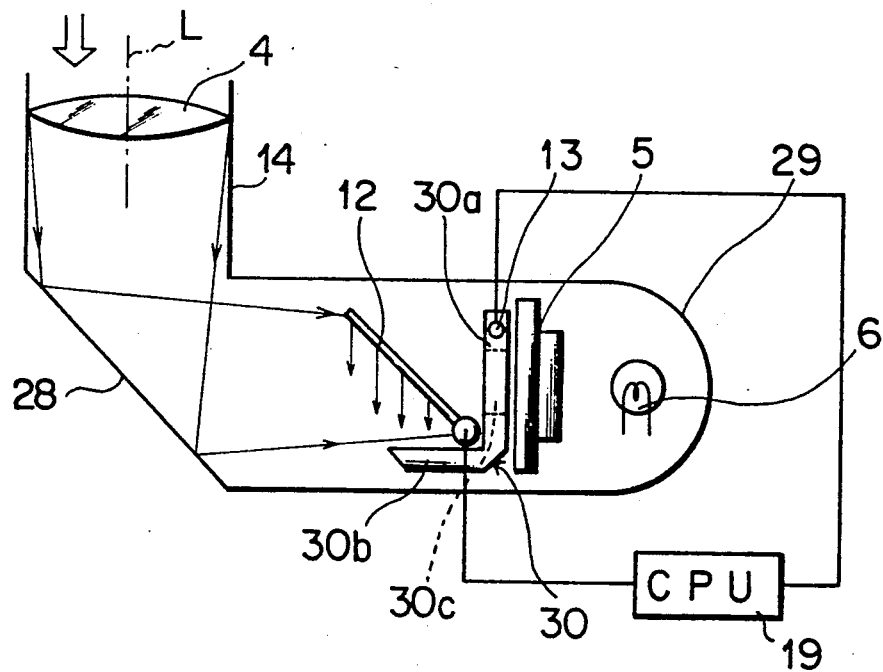

In FIGS. 1A and 1B, 29 denotes a light reflecting mirror for collecting the lights projected from the light source 6 for radiating the display device 5.

In front of the display device 5 in the mirror 28 side, a light conducting plate 30 made by a transparent resin plate or the like bent in a "L" shape and a shutter plate 12 whose rotational axis is located near the bent portion of the above "L" shape are disposed simultaneously.

Figure 2:
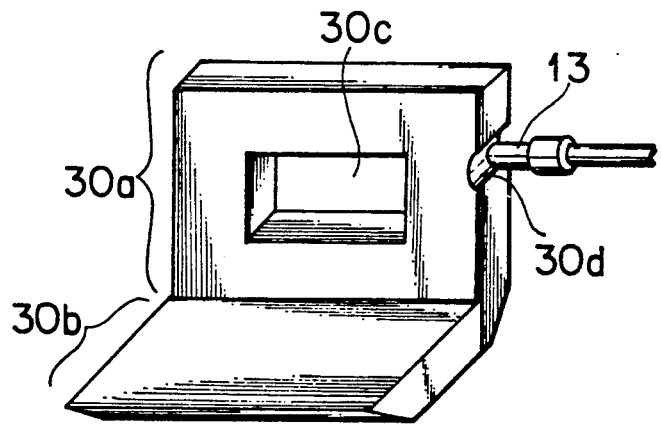
FIG. 2 shows a light conducting plate in the same embodiment above.
Figure 4:
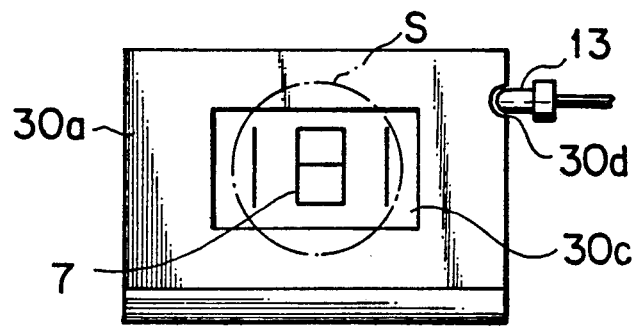
FIG. 4 is an explanatory view showing the spot of the external light radiated to the above light conducting plate.
Figure 5:
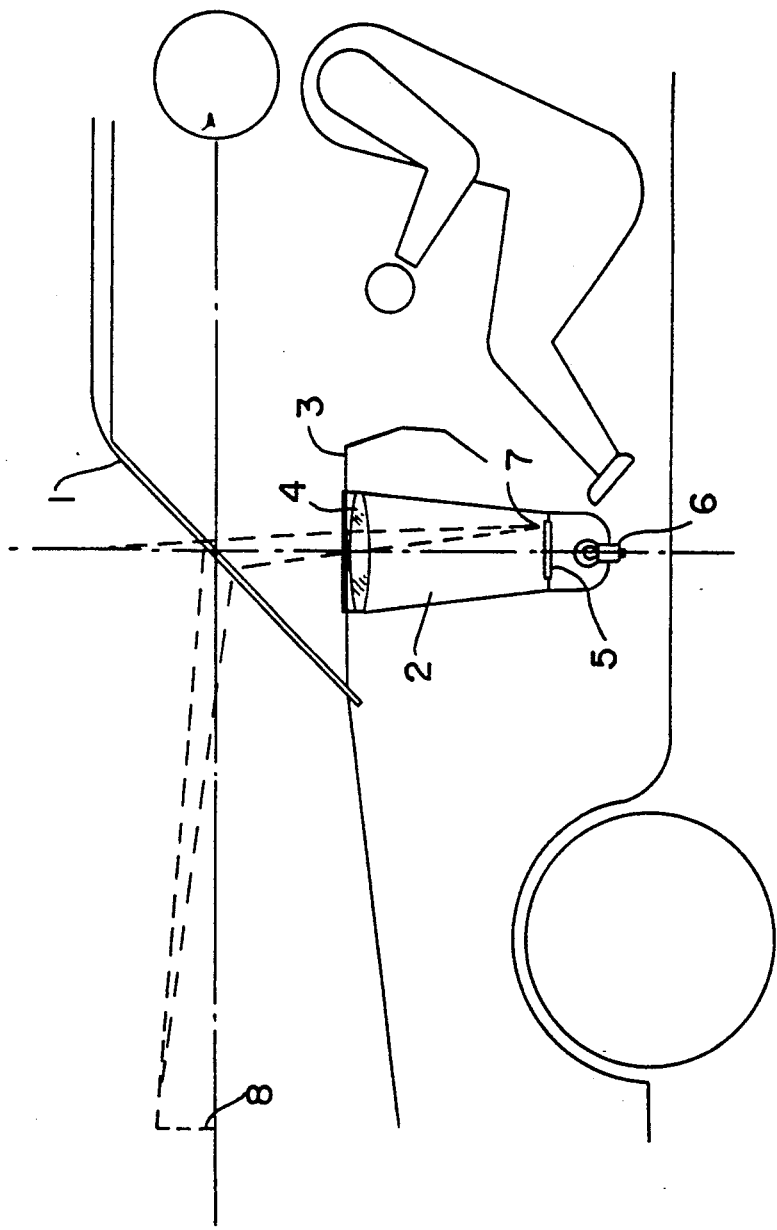
FIG. 5 shows a conventionally used head-up display device for vehicles.
Figure 6:
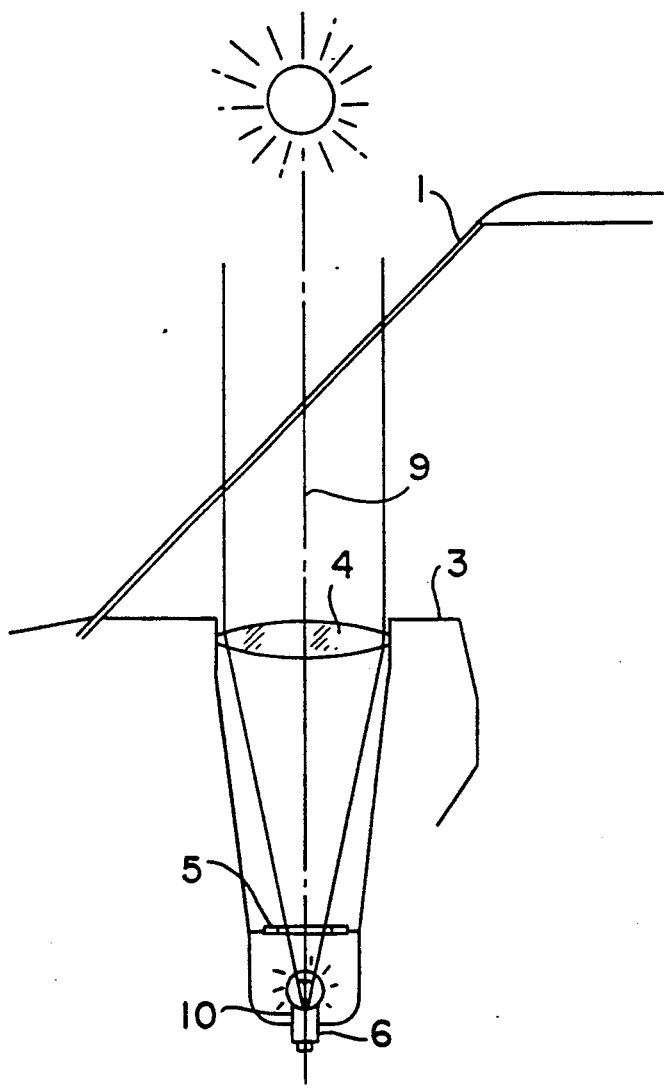
FIG. 6 is an explanatory view showing the problems contained in the conventional device being shown in FIG. 5; and, FIG. 7 shows the important part of another conventional example brought in comparison with the present invention.

FIG. 2 shows the above light conducting plate 30 being composed of a vetical surface 30a disposed in parallel with the displaying surface of the above display device 5 and a horizontal surface 30b located at a right angle against the above vertical surface 30a. As shown in FIG. 4, a window portion 30c which is formed wider than the pattern 7 indicated on the display device 5 is also disposed together with a light detecting element 13 which is attached by use of an adhesive or the like to the groove 30d arranged in the side surface of the light conducting plate 30.

Figure 3:
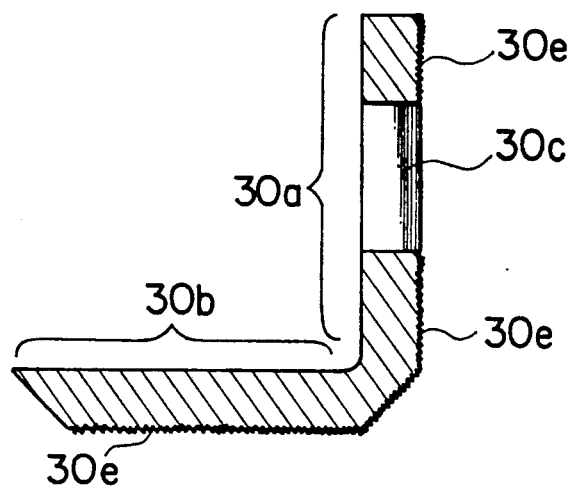
FIG. 3 shows a sectional view and the jagged surface of the light conducting plate in the same embodiment above.

Furthermore as shown in FIG. 3, the jagged surface 30e is formed by white painting, rough processing or the like on the externally exposed side of the above L shape, in other words on the surfaces respectively opposite to the horizontal surface 30b and the vertical surface 30a, thereby the rays of light incident entered from the inner surface of the above L shape are dispersed so as to be conducted to the light detecting element 13.

In the structure above, when the sunbeams enter along the optical axis of the lens 4 in the case that the shutter plate 12 is open (FIG. 1A), these sunbeams are collected by the lens 4 and reflected by the mirror 28 at the same time, so that the spot S of the incident rays is formed at the light receiving position of the vertical surface 30a of the light conducting plate 30.

Then, a part of rays gathered on the above spot S is received by the vertical surface 30a to be dispersed and conducted to the light detecting element 13, thereby the rays of incident light are detected. In this case, since the diameter of the spot S is determined by the location of the light conducting plate 30, the plate 30 can be freely settled, so that a part of the spot S which is overflowed from the window 30c can also be received by the horizontal surface 30a.

When the CPU 19 judges that the incident level of the light detected by the above light detecting element 1o has exceeded the predetermined level thereof, it activates the driving circuit to rotate the shutter plate 12 for 45 degree up towards the horizontal surface 30b so as to intercept the entry of the incident rays (FIG. 1B).

In the above case, the surface of the shutter plate 12 to which the incident rays are radiated is made of a mirror surface, so that these incident rays of light are reflected towards the horizontal surface 30b side of the light conducting plate 30. The above incident rays are then dispersed at the horizontal surface 30b and conducted to the vertical surface 30a at the same time, so as to be detected by the light conducting plate 30. In this structure above, the light conducting plate 30 is cut in a tapering shape at the fore end of the horizontal surface 30b and the other end thereof, which is opposite to the bent portion of the above "L" shape.

As explained above, when the CPU 19 judges that the level of the incident light is lowered to be within the predetermined level, the shutter 12 is opened to start projecting the indicated pattern.

In the above embodiment a shutter plate is adopted to intercept the incident rays towards the display device, but it can be arranged in such a way that the spot of the incident rays is diverted from the location of the display device by controlling the rotation of the mirror according to the quantity of the incident rays to enter, the above mirror rotatably being disposed between the display device and the lens.

In this case, the light conducting plate may be disposed between the lens and the mirror.

EFFECT OF THE INVENTION

As explained above, the indication display unit for vehicles according to the present invention is provided with a light conducting plate having a light detecting element to detect the incident rays for hampering the external light from irradiating the display device, and also having a window so that the light from the display device can be transmitted therethrough, wherein a conventionally used semi-translucent mirror is not used, resulting in that the light projected from the indicated pattern is not reduced so as to perform the clear display with moderate brightness on the windshield.

What is claimed is:

1. An indication display unit for a vehicle enabling a driver to sight an indicated image on a windshield thereof, comprising:
    a display device for indicating an image thereon;
    a lens through which said indicated image is projected on the windshield;
    a transparent light conducting means for conducting external light relative to said indication display unit to a light detecting element, and positioned between said display device and said lens, such that a substantial portion of the external light is directed thereto, said transparent light conducting means having a light detecting element positioned and a window portion defined therein, said window portion being formed in a size such that only the indicated image can be projected through said window portion;
    a shutter means for intercepting the external light relative to said indication display unit and light external to said transparent light conducting means, and rotatably arranged near said light conducting means, said transparent light conducting means being structured in "L" shape having a horizontal surface and a vertical surface, and said shutter means being rotatably arranged in front of said vertical surface, so that when said shutter means is activated to intercept incident light, the light is reflected toward said horizontal surface of said light conducting means; and
    a control means for controlling said shutter means.

2. An indication display unit for vehicles claimed in claim 1, wherein said display device further comprises an LCD with a light source for projecting light to said LCD.

3. An indication display unit for vehicles claimed in claim 1, wherein the surfaces of said transparent light conducting means respectively opposite to said horizontal and vertical surfaces are covered with a plurality of jagged portions for dispersing incident light in said transparent light conducting means to thereby conduct the incident light.

4. An indication display unit for vehicles claimed in claim 3, wherein said window portion is formed larger than said indicated image.

5. An indication display unit for vehicles claimed in claim 1, wherein an outer apex of the "L" shape and a fore end of said horizontal surface opposite to the outer apex of the "L" shape, are cut in a tapering shape.

6. An indication display unit for vehicles claimed in claim 5, wherein said light conducting means can be freely located.

7. An indication display unit for vehicles as claimed in claim 3, wherein said jagged portions are formed by a roughening process and covered with white paint.

* * * * *

UNITED STATES PATENT AND TRADEMARK OFFICE
CERTIFICATE OF CORRECTION

PATENT NO. : 5,144,289

DATED : September 1, 1992

INVENTOR(S) : OHSHIMA

It is certified that error appears in the above-identified patent and that said Letters Patent is hereby corrected as shown below:

On title page, item [75], change inventor's residence in Japan from "SUSONO" to SHIZUOKA--.

Signed and Sealed this

Fifth Day of October, 1993

*Attest:*

BRUCE LEHMAN

*Attesting Officer*     *Commissioner of Patents and Trademarks*